United States Patent
Lee

(10) Patent No.: US 11,954,293 B2
(45) Date of Patent: Apr. 9, 2024

(54) DISPLAY APPARATUS HAVING NORMAL MODE AND BIOMETRIC INFORMATION MEASUREMENT MODE

(71) Applicant: Samsung Display Co., Ltd., Yongin-si (KR)

(72) Inventor: Soongyu Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/684,293

(22) Filed: Mar. 1, 2022

(65) Prior Publication Data

US 2022/0365626 A1  Nov. 17, 2022

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0416* (2013.01); *G06F 3/04166* (2019.05)

(58) Field of Classification Search
CPC ............... G06F 3/0446; G06F 3/04166; G06F 3/041661
See application file for complete search history.

(56) References Cited

U.S. PATENT DOCUMENTS

| | | | |
|---|---|---|---|
| 10,977,470 B1* | 4/2021 | Chang | H04L 9/3231 |
| 2020/0042760 A1* | 2/2020 | Lee | G06V 40/1306 |
| 2020/0375545 A1 | 12/2020 | Kim et al. | |
| 2021/0089636 A1* | 3/2021 | Lee | H04M 1/725 |

FOREIGN PATENT DOCUMENTS

| | | | |
|---|---|---|---|
| KR | 10-2016-0044070 | | 4/2016 |
| KR | 10-2016-0112559 | | 4/2016 |
| KR | 20170016556 A | * | 2/2017 |
| KR | 10-2020-0139296 | | 12/2020 |
| KR | 10-2187853 | | 12/2020 |

* cited by examiner

*Primary Examiner* — Liliana Cerullo
(74) *Attorney, Agent, or Firm* — H.C. Park & Associates, PLC

(57) ABSTRACT

A display apparatus includes a touch panel including a plurality of electrodes and a touch driver. The touch panel includes first electrodes extending in a first direction and second electrodes extending in a second direction and overlapping the first electrodes. The touch driver is configured to drive the touch panel in a normal mode and a biometric information measurement mode. The touch driver is configured to sequentially apply a transmission signal to the first electrodes by shifting the transmission signal at each group of N electrodes (where N is a positive integer) in the normal mode, and to sequentially apply the transmission signal to the first electrodes by shifting the transmission signal at each group of Q electrodes (where Q is a positive integer greater than N) in the biometric information measurement mode.

12 Claims, 13 Drawing Sheets

| | RXP | | | | |
|---|---|---|---|---|---|
| TXL1 | 1 | 5 | 4 | 3 | 2 |
| TXL2 | 2 | 6 | 5 | 4 | 3 |
| TXL3 | 3 | 7 | 6 | 5 | 4 |
| TXL4 | 4 | 8 | 7 | 6 | 5 |
| | | 4 | 3 | 2 | 1 | RXP |
| | | RXL1 | RXL2 | RXL3 | RXL4 |

DISPLAY APPARATUS HAVING NORMAL MODE AND BIOMETRIC INFORMATION MEASUREMENT MODE

CROSS REFERENCE TO RELATED APPLICATION

This application claims priority from and the benefit of Korean Patent Application No. 10-2021-0062065 filed on May 13, 2021 which is hereby incorporated by reference for all purposes as if fully set forth herein.

BACKGROUND

Field

Embodiments of the invention relate to a display apparatus and more specifically, to a display apparatus for driving a touch panel in a normal mode and a biometric information measurement mode.

Discussion of the Background

A touch panel is an apparatus for recognizing an input action or event performed by a user. Typically, the touch panel may generate an electrical signal to detect the touch presence and the touch location when the touch panel is touched by an object such as a finger or a stylus pen. The touch panel may be mounted on a top surface of a display panel, such as an organic light emitting diode display panel or a liquid crystal display panel, or formed inside the display panel, and may be classified as a resistive film type, a capacitance type, an electromagnetic field type, an infrared ray type, a surface acoustic wave (SAW) type, a near field imaging (NFI) type, and the like. Among such various types of the touch panels, the capacitance type touch panel for measuring a change in mutual capacitance has been widely used due to a fast response speed and a thin thickness thereof.

In recent years, touch panels have required not only to detect the touch presence and the touch location, but also to measure biometric information of the user. However, it is difficult to precisely measure the biometric information in the capacitance type touch panel because the amount of the change in mutual capacitance according to a change in the biometric information is small.

The above information disclosed in this Background section is only for understanding of the background of the inventive concepts, and, therefore, it may contain information that does not constitute prior art.

SUMMARY

Display apparatuses constructed according to the principles of the invention are capable of driving a touch panel in a normal mode and a biometric information measurement mode, and precisely measuring a change in mutual capacitance according to a change in biometric information in the biometric information measurement mode.

Display apparatuses constructed according to the principles of the invention are capable of reducing or minimizing the number of frame periods required to measure biometric information by adjusting a frame frequency to be low in a biometric information measurement mode. As a result, time for measuring biometric information in the display apparatus may be shortened.

Display apparatuses constructed according to the principles of the invention are capable of removing a noise generation period because biometric information is not measured in frames immediately after mode conversion to improve the sensing quality thereof.

Additional features of the inventive concepts will be set forth in the description which follows, and in part will be apparent from the description, or may be learned by practice of the inventive concepts.

According to an aspect of the invention, a display apparatus includes a touch panel including a plurality of electrodes, and a touch driver configured to drive the touch panel. The touch panel includes first electrodes extending in a first direction, and second electrodes extending in a second direction intersecting the first direction, the second electrodes overlapping the first electrode. The touch driver drives the touch panel in a normal mode and a biometric information measurement mode, sequentially applies a transmission signal to the first electrodes by shifting the transmission signal at each group of N electrodes (where N is a positive integer) in the normal mode, sequentially applies the transmission signal to the first electrodes by shifting the transmission signal at each group of Q electrodes (where Q is a positive integer greater than N) in the biometric information measurement mode, and measures biometric information based on a measurement value received from the second electrodes during a sensing period having K frame periods (where K is a positive integer) in the biometric information measurement mode.

The touch driver sequentially may apply the transmission signal to the second electrodes by shifting the transmission signal at each group of Q electrodes after sequentially applying the transmission signal to the first electrodes by shifting the transmission signal at each group Q electrodes in the biometric information measurement mode.

The touch driver may apply the transmission signal only to predetermined row electrodes of the first electrodes or predetermined column electrodes of the second electrodes in the biometric information measurement mode.

The touch driver may not apply the transmission signal to an electrode having a measurement value that does not exceed a predetermined reference value while a touch operation is being sensed in the biometric information measurement mode.

The touch operation may be sensed by determining whether a sum of the measurement values generated by the transmission signal sequentially applied by shifting the transmission signal at each group of Q electrodes exceeds a predetermined threshold value.

The touch driver may measure the biometric information at intersection points of the first electrodes and the second electrodes based on the measurement value received from the first electrodes and the measurement value received from the second electrodes.

The touch driver may not measure the biometric information during a predetermined reference period after the normal mode is converted into the biometric information measurement mode.

The biometric information measurement mode, the touch driver may apply the transmission signal having a voltage greater than a voltage of the transmission signal in the normal mode.

The touch driver may adjust the voltage of the transmission signal such that the voltage of the transmission signal increases over time in the biometric information measurement mode.

The biometric information measurement mode may include a first information mode and a second information mode. The touch driver may operate the first information mode and the second information mode. The voltage of the transmission signal in the first information mode may be smaller than the voltage of the transmission signal in the second information mode.

According to another aspect of the invention, a display apparatus includes a touch panel including a plurality of electrodes, and a touch driver configured to drive the touch panel. The touch panel includes first electrodes extending in a first direction, and second electrodes extending in a second direction and overlapping the first electrodes. The touch driver drives the touch panel in a normal mode and a biometric information measurement mode, sequentially applies a transmission signal to the first electrodes by shifting the transmission signal at each group of N electrodes (where N is a positive integer) in the normal mode, sequentially applies the transmission signal to the first electrodes by shifting the transmission signal at each group of Q electrodes (where Q is a positive integer greater than N) in the biometric information measurement mode, measures biometric information based on a measurement value received from each electrode during a sensing period having K frame periods (where K is a positive integer) in the biometric information measurement mode, and adjusts a frame frequency such that the frame frequency in the biometric information measurement mode is lower than the frame frequency in the normal mode.

In an embodiment, the touch driver may adjust the frame frequency such that the frame frequency decreases over time in the biometric information measurement mode.

In an embodiment, wherein the biometric information measurement mode may include a first information mode and a second information mode. The touch driver may operate the first information mode and the second information mode, and the frame frequency in the first information mode may be greater than the frame frequency in the second information mode.

In an embodiment, in the biometric information measurement mode, the touch driver may apply the transmission signal having a voltage greater than a voltage of the transmission signal in the normal mode.

In an embodiment, the touch driver may adjust the voltage of the transmission signal such that the voltage of the transmission signal increases over time in the biometric information measurement mode.

In an embodiment, the touch driver may not measure the biometric information during a predetermined reference period after the normal mode is converted into the biometric information measurement mode.

According to embodiments, a display apparatus includes a touch panel including a plurality of electrodes, and a touch driver configured to drive the touch panel. The touch panel includes first electrodes extending in a first direction, and second electrodes extending in a second direction and overlapping the first electrodes. The touch driver drives the touch panel in a normal mode and a biometric information measurement mode, sequentially applies a transmission signal to the first electrodes by shifting the transmission signal at each group of N electrodes (N is a positive integer) in the normal mode, sequentially applies the transmission signal to the first electrodes by shifting the transmission signal at each group of Q electrodes (where Q is a positive integer greater than N) in the biometric information measurement mode, measures biometric information based on a measurement value received from each electrode during a sensing period including K frame periods (where K is a positive integer) in the biometric information measurement mode, and applies the transmission signal having a voltage in the biometric information measurement mode greater than a voltage of the transmission signal in the normal mode, in the biometric information measurement mode.

In an embodiment, the touch driver may adjust the voltage of the transmission signal such that the voltage of the transmission signal increases over time in the biometric information measurement mode.

In an embodiment, the biometric information measurement mode may include a first information mode and a second information mode. The touch driver may operate the first information mode and the second information mode, and the voltage of the transmission signal in the first information mode may be smaller than the voltage of the transmission signal in the second information mode.

In an embodiment, the touch driver may not measure the biometric information during a predetermined reference period after the normal mode is converted into the biometric information measurement mode.

Therefore, a display apparatus according to embodiments may simultaneously apply more transmission signal in a biometric information measurement mode than in a normal mode. Accordingly, a time required to apply all the transmission signals may be shortened in the biometric information measurement mode of the display apparatus, so more measurement values may be generated and the display apparatus may be received in the biometric information measurement mode than in the normal mode during the same time period. As a result, the display apparatus may more precisely measure a change in mutual capacitance in the biometric information measurement mode than in the normal mode.

A display apparatus according to embodiments may alternately apply transmission signal to first electrodes and second electrodes in a biometric information measurement mode. Since the display apparatus may take into account both measurement value received from the first electrodes and the measurement value received from the measurement value received from the second electrodes, it is possible to precisely measure a change in mutual capacitance at an intersection point.

A display apparatus according to embodiments may prevent unnecessary energy use because unnecessary transmission signal may not be applied in a biometric information measurement mode.

A display apparatus according to embodiments may increase the variation range of mutual capacitance according to a change in biometric information by adjusting voltage of transmission signal to be high in the biometric information measurement mode. Accordingly, the display apparatus may have a high measurement value even with the same change in the biometric information.

A display apparatus according to embodiments may measure various kinds of biometric information according to voltage by varying voltage of transmission signal in a biometric information measurement mode.

A display apparatus according to embodiments may receive more measurement values during one frame period by adjusting the frame frequency to be low in a biometric information measurement mode so that it is possible to precisely measure a change in mutual capacitance according to a change in biometric information.

A display apparatus according to embodiments may measure various kinds of biometric information according to a frame frequency by changing the frame frequency in a biometric information measurement mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
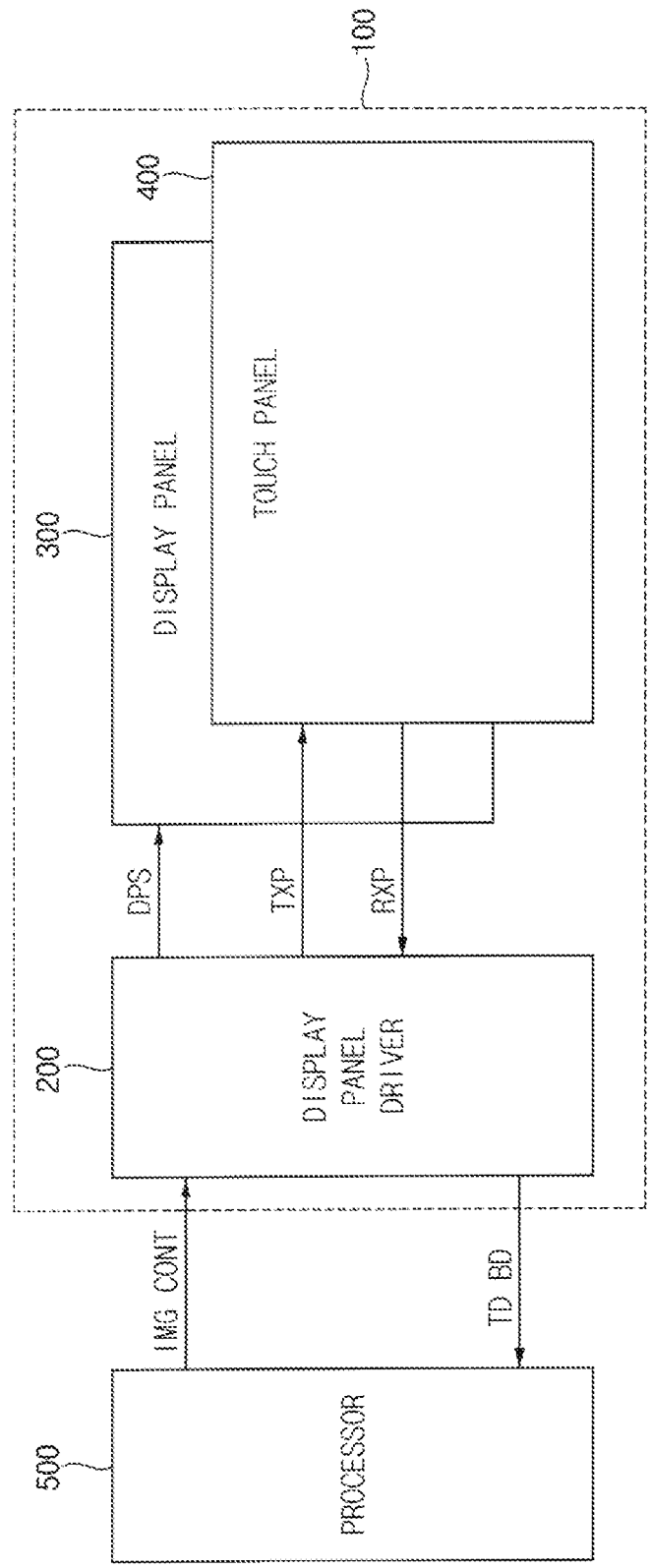
FIG. 1 is a block diagram of an embodiment of a display apparatus constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
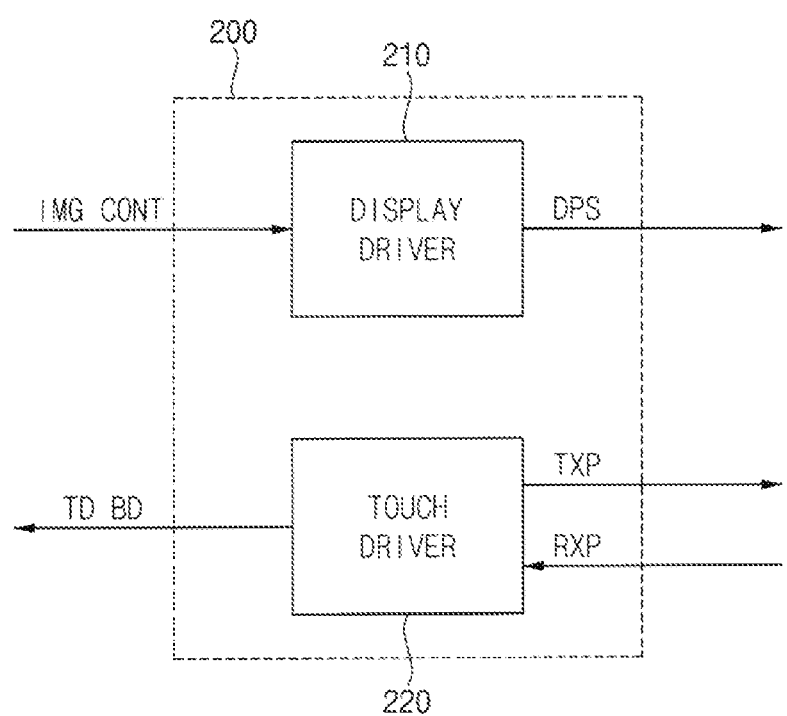
FIG. 2 is a block diagram of a display panel driver of FIG. 1.

FIG. 1 is a block diagram illustrating a display apparatus 100 according to embodiments. FIG. 2 is a block diagram illustrating a display panel driver 200 of FIG. 1.

Referring to FIGS. 1 and 2, the display apparatus 100 may include a display panel driver 200, a display panel 300, and a touch panel 400. The display panel driver 200 may control or drive the display panel 300 and the touch panel 400. The display panel 300 may include a plurality of pixels. The touch panel 400 may include a plurality of electrodes. The display panel driver 200 may include a display driver 210 for driving the display panel 300 and a touch driver 220 for driving the touch panel 400. The touch panel 400 may be an add-on type touch panel attached to the display panel 300 or an embedded type touch panel formed in the display panel 300. For example, the touch panel 400 may be an on-cell type embedded touch panel or an in-cell type embedded touch panel, but embodiments are not limited thereto.

The display panel 300 may be driven or controlled by the display driver 210 to display an image. The display panel 300 may include a plurality of data lines, a plurality of gate lines, and a plurality of pixels connected to the plurality of data lines and the plurality of gate lines. In an embodiment, the display panel 300 may be an organic light emitting diode display panel in which each of the pixels includes an organic light emitting diode. However, the display panel 300 is not limited to the organic light emitting diode display panel. For example, the display panel 300 may include any display panel, for example, a liquid crystal display (LCD) panel, a light emitting diode (LED) panel, a field emission display (FED) panel and the like.

The display driver 210 may drive or control the display panel 300 based on input image data IMG and a control signal CONT provided from a processor, e.g., a graphic processing unit (GPU). In an embodiment, the input image data IMG may be RGB data including red image data, green image data, and blue image data. Further, in an embodiment, the control signal CONT may include an input data enable signal, a master clock signal, a vertical synchronization signal, a horizontal synchronization signal, etc., but embodiments are not limited thereto. The display driver 210 may generate a display panel driving signal DPS based on the input image data IMG and the control signal CONT, and provide the display panel driving signal DPS to the display panel 300 to drive the display panel 300. In an embodiment, the display panel driving signal DPS may include a gate signal and a data signal, and the display driver 210 may include a gate driver for providing the gate signal to the display panel 300, a data driver for providing the data signal to the display panel 300, and a driving controller for controlling timings of the gate driver and the data driver, but embodiments are not limited thereto.

The touch panel 400 may be a capacitive touch panel that measures a change in mutual capacitance by a touch of an object (e.g., a finger, a stylus pen, etc.). For example, the object may include a conductive object. A detailed explanation thereof will be given below.

The touch driver 220 may apply a transmission signal TXP to the touch panel 400. The touch driver 220 may receive a measurement value RXP from the touch panel 400. The measurement value RXP may be an amount of the change in the mutual capacitance at intersection points of the first electrodes TXL and the second electrodes RXL to which the transmission signal TXP is applied. When a touch of the object is occurred at the intersection point, the mutual capacitance at the intersection points of the first electrodes TXL and the second electrodes RXL may become small. The object may be human skin. When a touch of the human skin is occurred at the intersection point, the mutual capacitance at the intersection points may decrease as the degree of hydration of the human skin increases.

The touch driver 220 may generate touch data TD indicating the touch position of the object based on the measurement value RXP received from each electrode during a sensing period including K frame periods, where K is a positive integer. The touch driver 220 may generate biometric data BD including biometric information based on the measurement value RXP received from each electrode during one frame period. The touch driver 220 may provide the touch data TD and the biometric data BD to a processor 500. The biometric information may be characteristics of each person, such as skin hydration and muscle density, which is varied according to persons.

Figure 3:
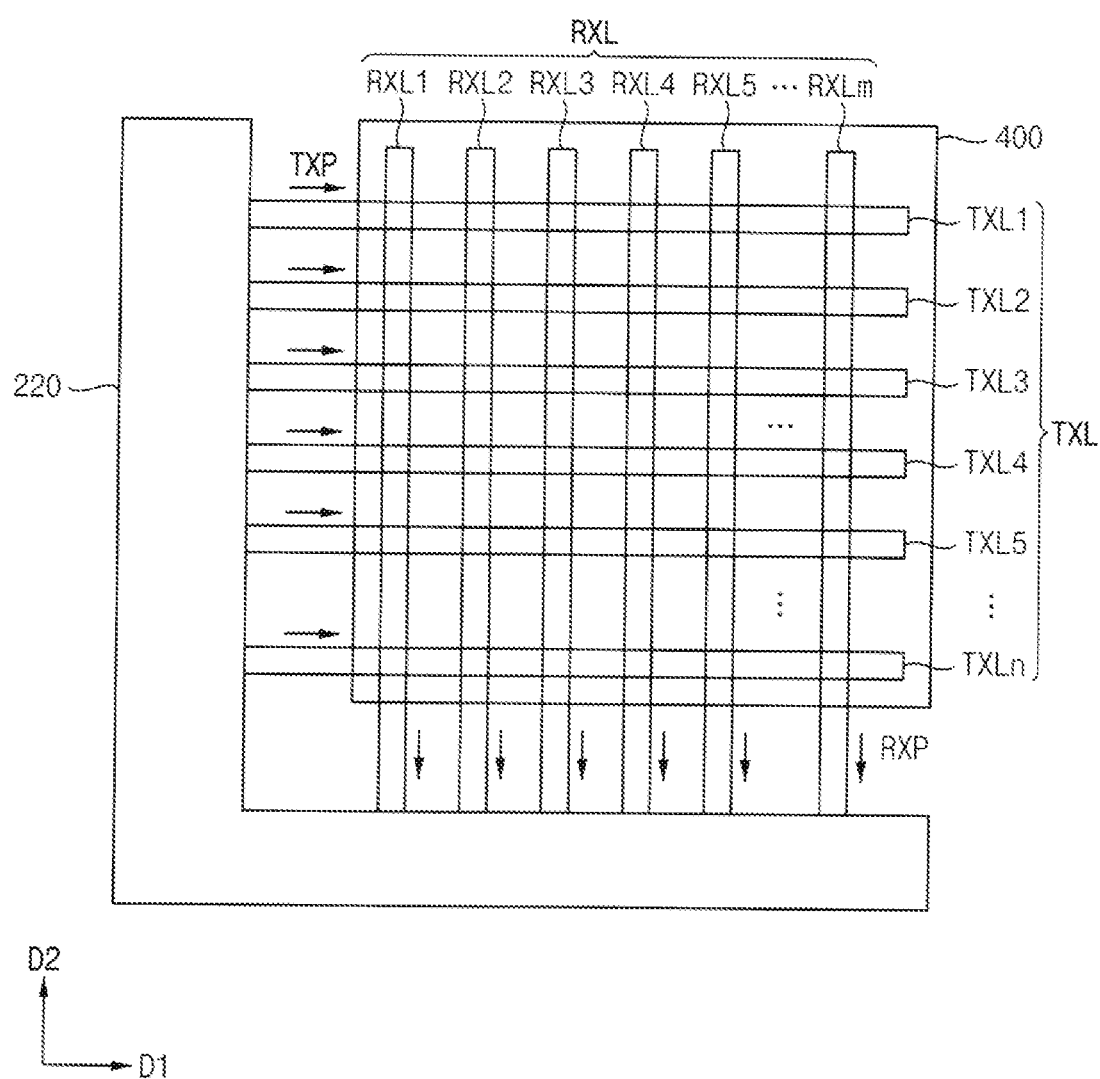
FIG. 3 is a block diagram of a touch panel of FIG. 1.

FIG. 3 is a block diagram illustrating the touch panel of FIG. 1.

Referring to FIG. 3, the touch panel 400 may include first electrodes TXL (TXL1, TXL2, TXL3, TXL4, TXL5, . . . , and TXLn) extending in the first direction D1 and second electrodes RXL (RXL1, RXL2, RXL3, RXL4, RXL5, . . . , and RXLm) extending in the second direction D2 and overlapping the first electrodes TXL (TXL1, TXL2, TXL3, TXL4, TXL5, . . . , and to TXLn), where n and m are positive integers. For example, the first electrodes TXL may include a first row electrode TXL1, a second row electrode TXL2, a third row electrode TXL3, a fourth row electrode TXL4, a fifth row electrode TXL5, . . . , and an n-th row electrode TXLn. For example, the second electrodes RXL may include a first column electrode RXL1, a second column electrode RXL2, a third column electrode RXL3, a fourth column electrode RXL4, a fifth column electrode RXL5, . . . , and an m-th column electrode RXLm. For example, the first electrodes TXL may be transmitting electrodes, and the second electrodes RXL may be receiving electrodes. Alternatively, the first electrodes TXL may be receiving electrodes, and the second electrodes RXL may be transmitting electrodes.

Energy may be transferred between the overlapping first and second electrodes TXL and RXL. The touch driver 220 may apply the transmission signal TXP to the first electrodes TXL (TXL1 to TXLn). The transmission signal TXP may be an electrical signal. The touch driver 220 may receive the measurement value RXP from the second electrodes RXL (RXL1 to RXLm) of the touch panel 400. When the transmission signal TXP is applied to the first electrodes TXL (TXL1 to TXLn), the measurement value RXP may be provided to the touch driver 220 through the second electrodes RXL (RXL1 to RXLm). When the transmission signal TXP is applied to the second electrodes RXL (RXL1 to RXLm), the measurement value RXP may be provided to the touch driver 220 through the first electrodes TXL (TXL1 to TXLn). The measurement value RXP may be an amount of the change in the mutual capacitance at the intersection points of the first electrodes TXL (TXL to TXLn) and the second electrodes RXL (RXL1 to RXLm). Each of the second electrodes RXL may have the measurement value RXP. For example, when the transmission signal TXP is simultaneously applied to a plurality of electrodes, the measurement value RXP may be a sum of changes in mutual capacitance at all intersection points of the plurality of electrodes to which the transmission signal TXP is arrived. The number of the first electrodes TXL (TXL1 to TXLn) and the number of the second electrodes RXL (RXL1 to RXLm) may be varied.

Figure 4:
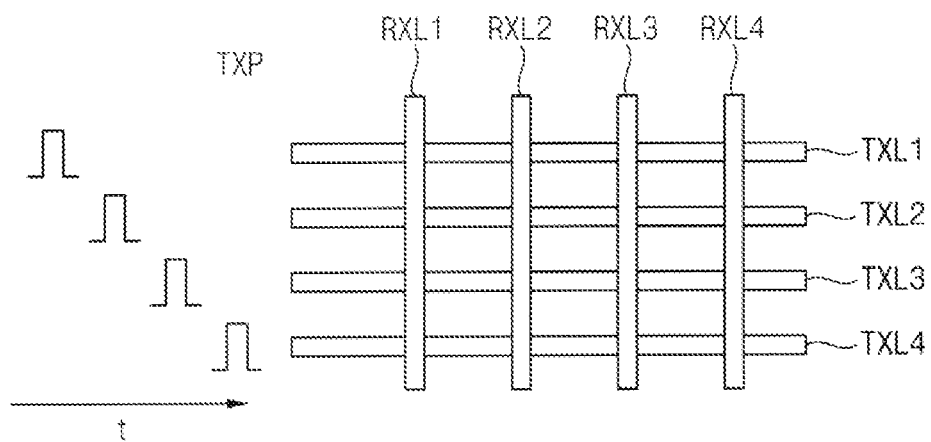
FIG. 4 is a diagram illustrating an example in which the display apparatus of FIG. 1 drives a touch panel in a normal mode.
Figure 5:
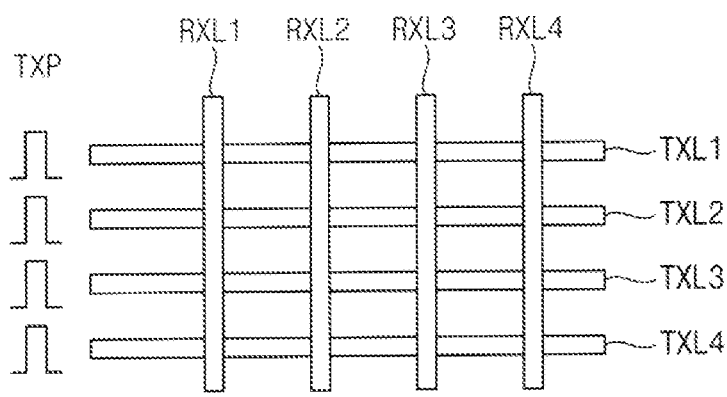
FIG. 5 is a diagram illustrating an example in which the display apparatus of FIG. 1 drives a touch panel in a biometric information measurement mode.

FIG. 4 is a diagram illustrating an example in which the display apparatus 100 of FIG. 1 drives or controls the touch panel 400 in a normal mode. FIG. 5 is a diagram illustrating an example in which the display apparatus 100 of FIG. 1 drives or controls the touch panel 400 in a biometric information measurement mode.

Referring to FIGS. 4 and 5, the touch driver 220 may drive the touch panel 400 in the normal mode and the biometric information measurement mode. In the normal mode, the touch driver 220 may sequentially apply the transmission signal TXP to the first electrodes TXL (TXL1 to TXLn) by shifting the transmission signal TXP at each group of N electrodes, where N is a positive integer. For example, when N is 1, in the normal mode, the transmission signal TXP may be sequentially applied to the first electrodes TXL by shifting the transmission signal TXP at a single electrode. For example, when N is 2, in the normal mode, the transmission signal TXP may be sequentially applied to the first electrodes TXL by shifting the transmission signal TXP at each group of two electrodes.

In the biometric information measurement mode, the touch driver 220 may sequentially apply the transmission signal TXP to the first electrodes TXL (TXL1 to TXLn) by shifting the transmission signal TXP at each group of Q electrodes, where Q is a positive integer greater than N. When Q is equal to the number of first electrodes TXL (TXL1 to TXL4), the touch driver 220 may simultaneously apply the transmission signal TXP to all the first electrodes TXL (TXL1 to TXLn). For example, as illustrated in FIG. 5, when Q is equal to the number of first electrodes TXL in the biometric information measurement mode, the touch driver 220 may simultaneously apply the transmission signal TXP to the first row electrode TXL1, the second row electrode TXL2, the third row electrode TXL3, and the fourth row electrode TXL4. In the biometric information measurement mode, the biometric information may be measured based on the measurement value RXP received from each of the second electrodes RXL during the sensing period including K frame periods.

Referring to FIG. 4, it is assumed that N is 1. In the normal mode, the first electrodes TXL (e.g., the first row electrode TXL1 to the fourth row electrode TXL4) may sequentially receive the transmission signal TXP one by one. For example, first, the transmission signal TXP may be applied to the first row electrode TXL1 of the first electrodes TXL. Second, the transmission signal TXP may be applied to the second row electrode TXL2 of the first electrodes TXL. Third, the transmission signal TXP may be applied to the third row electrode TXL3 of the first electrodes TXL. Fourth, the transmission signal TXP may be applied to the fourth row electrode TXL4 of the first electrodes TXL. This is only an example, and the order of applying the transmission signal TXP may not be fixed but be varied. Such a sequential order of applying the transmission signal TXP may be used to measure the touch position of the object.

Referring to FIG. 5, it is assumed that Q is 4. In the biometric information measurement mode, the first electrodes TXL (e.g., the first row electrode TXL1 to the fourth row electrode TXL4) may simultaneously receive the transmission signal TXP by shifting the transmission signal TXP at each group of four electrodes (e.g., the first to fourth row electrodes TXL1 to TXL4). For example, at the same time, the touch driver 220 may apply the transmission signal TXP to the first row electrode TXL1 of the first electrodes TXL, the second row electrode TXL2 of the first electrodes TXL, the third row electrode TXL3 of the first electrodes TXL, and the fourth row electrode TXL4 of the first electrodes TXL. Accordingly, since a time required to apply all the transmission signals TXP may be shortened in the biometric information measurement mode, the display apparatus 100 may generate and receive more measurement values RXP than in the normal mode during the same time period. As a result, in the biometric information measurement mode, the display apparatus 100 may measure the biometric information based on more measurement values RXP even if the measurement value RXP is small. Therefore, the display apparatus 100 may more precisely measure the change in the mutual capacitance in the biometric information measurement mode than in the normal mode.

Figure 6:
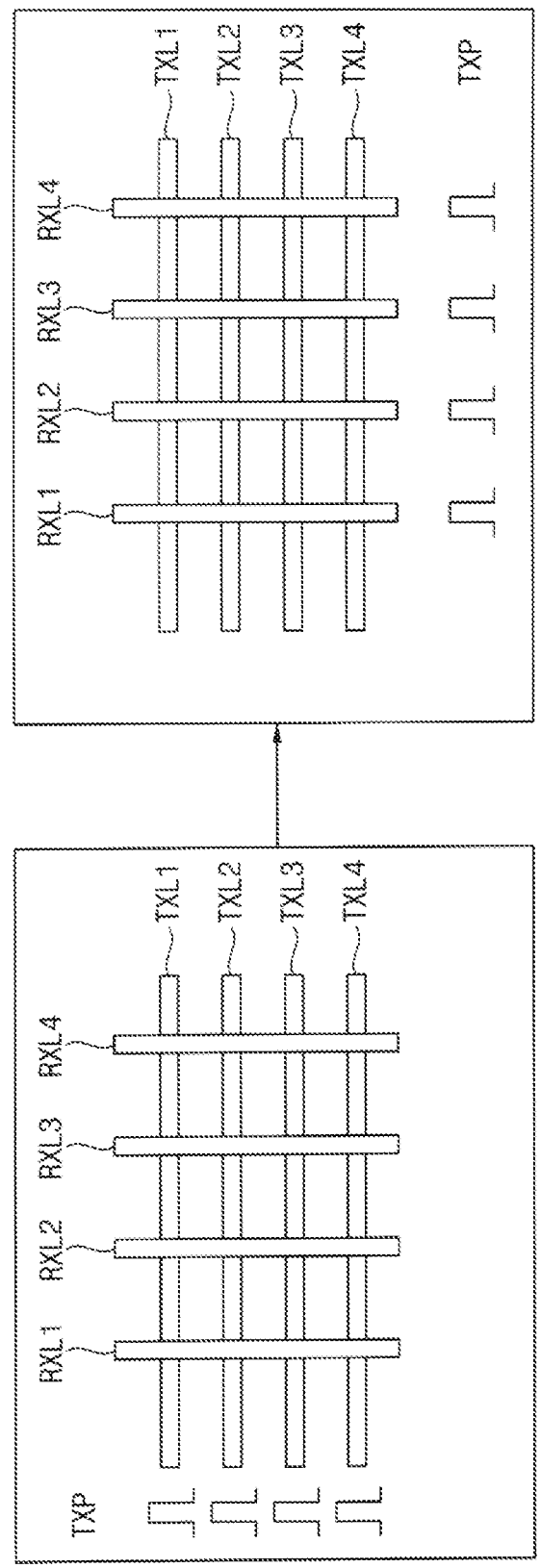
FIG. 6 is a diagram illustrating another example in which the display apparatus of FIG. 1 drives a touch panel in a biometric information measurement mode.

FIG. 6 is a diagram illustrating an example in which the display apparatus 100 of FIG. 1 drives the touch panel 400 in the biometric information measurement mode.

Referring to FIG. 6, the touch driver 220 may sequentially apply the transmission signal TXP to the second electrodes RXL (RXL1 to RXLm) by shifting the transmission signal TXP at each group of Q electrodes after sequentially applying the transmission signal TXP to the first electrodes TXL (TXL1 to TXLn) by shifting the transmission signal TXP at each group of Q electrodes in the biometric information measurement mode. When Q is equal to the number of the second electrodes RXL (RXL1 to RXL4), the touch driver 220 may simultaneously apply the transmission signal TXP to all the second electrodes RXL (RXL1 to RXL4). The touch driver 220 may repeat the operation of sequentially applying the transmission signal TXP to the first electrodes TXL (TXL1 to TXL4) by shifting the transmission signal TXP at each group of Q electrodes and sequentially applying the transmission signal TXP to the second electrodes RXL (RXL1 to RXL4) by shifting the transmission signal TXP at each group of Q electrodes.

For example, it is assumed that Q is 4. For example, the transmission signal TXP may be simultaneously applied to a first column electrode RXL1 of the second electrode RXL, a second column electrode RXL2 of the second electrode RXL, a third column electrode RXL3 of the second electrode RXL, and a fourth column electrode RXL4 of the second electrode RXL after the transmission signal TXP is sequentially applied to the first row electrode TXL1 of the first electrode TXL, the second row electrode TXL2 of the first electrode TXL, the third row electrode TXL3 of the first electrode TXL, and the fourth row electrode TXL4 of the first electrode TXL.

Figures 7, 8:
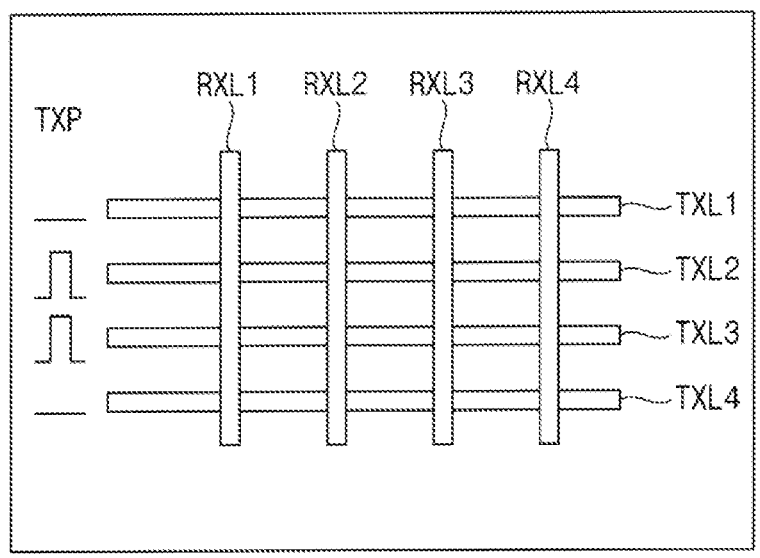
FIG. 7 is a table illustrating another example in which the display apparatus of FIG. 1 measures biometric information at intersection points of first electrodes and second electrodes in a biometric information measurement mode.
FIG. 8 is a diagram illustrating another example in which the display apparatus of FIG. 1 drives a touch panel in a biometric information measurement mode.

FIG. 7 is a table illustrating an example in which the display apparatus of FIG. 1 measures the biometric information at the intersection points of the first electrodes TXL and the second electrodes RXL in the biometric information measurement mode.

Referring to FIG. 7, the biometric information may be measured at the intersection points between the first electrodes TXL (TXL1 to TXLn) and the second electrodes RXL (RXL1 to RXLm) based on the measurement value RXP received from the first electrodes TXL (TXL1 to TXLn) and the measurement value received from the second electrodes RXL (RXL1 to RXLm).

For example, when the transmission signal TXP is applied only once to each of the first electrodes TXL (TXL1, TXL2, TXL3, and TXL4) and the second electrodes RXL (RXL1, RXL2, RXL3, and RXL4) during one frame period, the touch driver 220 may measure the biometric information based on one measurement value RXP for each electrode. The measurement value RXP at the first row electrode TXL1 of the first electrode TXL may be 1 as a relative value. The measurement value RXP at the second row electrode TXL2 of the first electrode TXL may be 2 as a relative value. The measurement value RXP at the third row electrode TXL3 of the first electrode TXL may be 3 as a relative value. The measurement value RXP at the fourth row electrode TXL4 of the first electrode TXL may be 4 as a relative value. The measurement value RXP at the first column electrode RXL1 of the second electrode RXL may be 4 as a relative value. The measurement value RXP at the second column electrode RXL2 of the second electrode RXL may be 3 as a relative value. The measurement value RXP at the third column electrode RXL3 of the second electrode RXL may be 2 as a relative value. The measurement value RXP at the fourth column electrode TXL4 of the second electrode RXL may be 1 as a relative value. The biometric information at the intersection points of the first and second electrodes TXL and RXL may be measured based on a value obtained by adding up the measurement values RXP of the two electrodes intersecting each other at the intersection point. For example, the biometric information at the intersection points between the first row electrode TXL1 of the first electrode and the first column electrode RXL1 of the second electrode may be measured based on 8 as a relative value that is obtained by adding up 4 and 4.

FIG. 8 is a diagram illustrating an example in which the display apparatus 100 of FIG. 1 drives the touch panel 400 in the biometric information measurement mode.

Referring to FIG. 8, in the biometric information measurement mode, the transmission signal TXP may be applied only to predetermined fixed row electrodes of the first electrodes TXL (TXL1 to TXLn) or predetermined fixed column electrodes of the second electrodes RXL (RXL1 to RXLm). For example, when the fixed row electrodes are TXL2 and TXL3, the touch driver 220 may not apply the transmission signal TXP to the lines except for the fixed row electrodes TXL2 and TXL3 in the biometric information measurement mode. Therefore, the display apparatus 100 may prevent unnecessary energy use because the transmission signal TXP may be prevented from being unnecessarily applied in the biometric information measurement mode. The fixed row electrodes may vary according to the biometric information to be measured.

Figure 9:
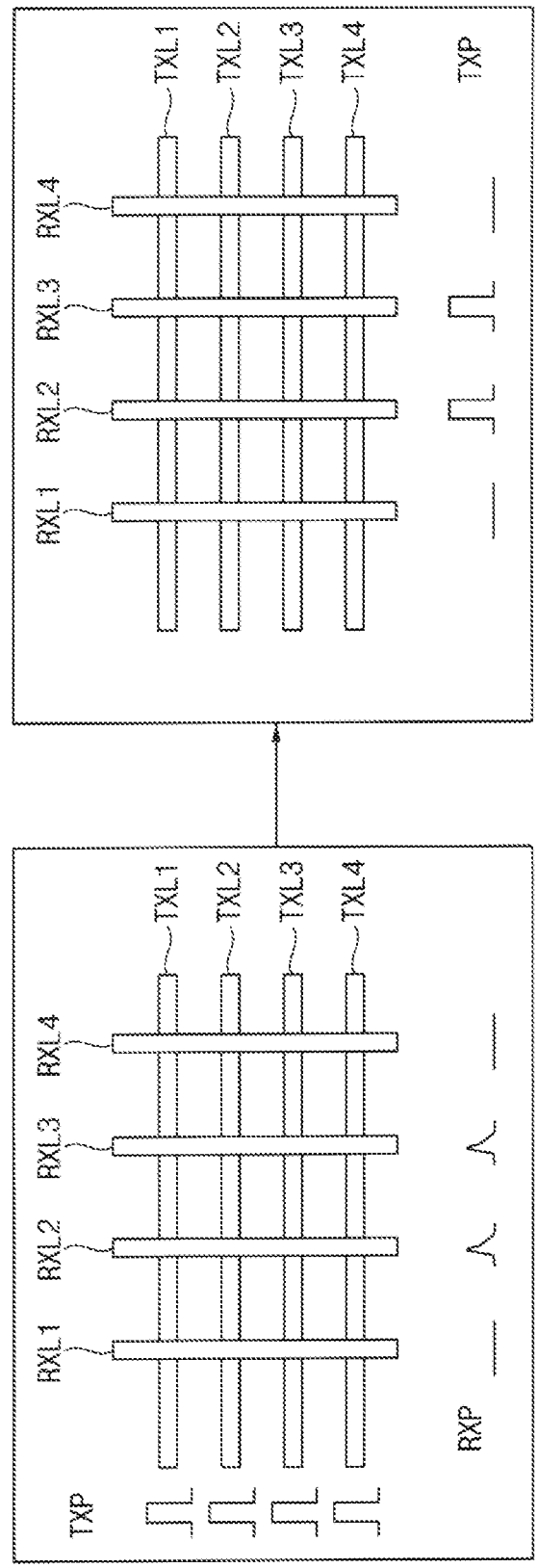
FIG. 9 is a diagram illustrating another example in which the display apparatus of FIG. 1 drives a touch panel in a biometric information measurement mode.

FIG. 9 is a diagram illustrating an example in which the display apparatus 100 of FIG. 1 drives the touch panel 400 in the biometric information measurement mode.

Referring to FIG. 9, the touch driver 220 may not apply the transmission signal TXP to an electrode having the measurement value RXP that does not exceed a predetermined reference value while a touch operation is being sensed in the biometric information measurement mode. The touch operation may be sensed by determining whether a sum of the measurement values RXP generated by the transmission signal TXP sequentially applied by shifting the transmission signal TXP at each group of Q electrodes exceeds a predetermined threshold value. The reference value may be an amount of the change in the mutual capacitance which is considered that there is no touch of the object at any of the intersection points. The threshold value may be a sum of the amounts of the changes in the mutual capacitance which is considered that there is no touch of the object on the touch panel 400.

For example, when it is assumed that Q is 4, the transmission signal TXP may be simultaneously applied to the first row electrode TXL1, the second row electrode TXL2, the third row electrode TXL3, and the fourth row electrode TXL4. When the sum of the measurement values RXP of the first column electrode RXL1 of the second electrode, the second column electrode RXL2 of the second electrode, the third column electrode RXL3 of the second electrode, and the fourth column electrode RXL4 of the second electrode exceeds the threshold value and the measurement values RXP of the first column electrode RXL1 of the second electrode and the fourth column electrode RXL4 of the second electrode do not exceed the reference value, the touch driver 220 may not apply the transmission signal TXP to the first column electrode RXL1 and the fourth column electrode RXL4 of the second electrode.

Figure 10:
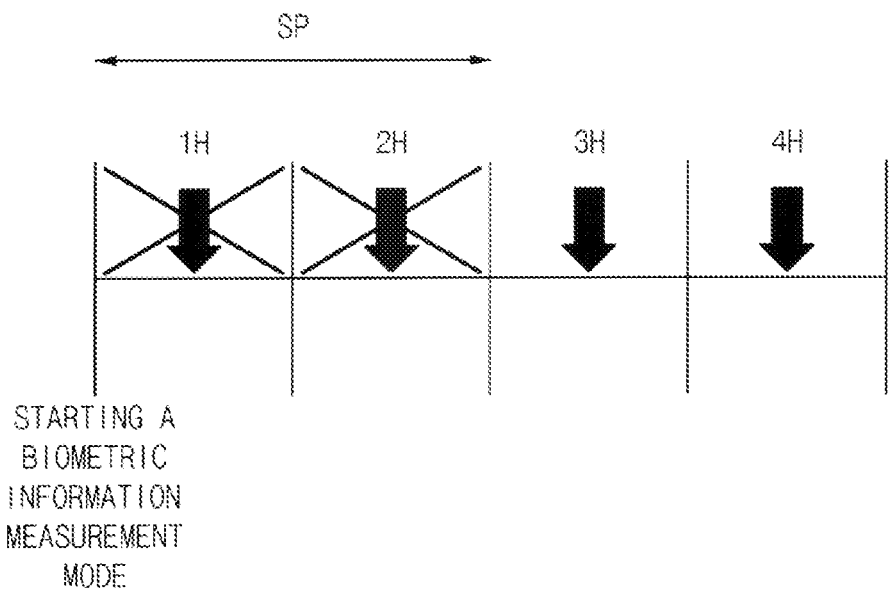
FIG. 10 is a diagram illustrating an example of an operation after mode conversion of a touch driver of FIG. 1.

FIG. 10 is a diagram illustrating an example of an operation after the mode conversion of the touch driver of FIG. 1.

Referring to FIG. 10, the touch driver 220 may not measure the biometric information during a predetermined reference period SP after the mode conversion.

For example, when the reference period SP is set to 2 frame periods, the biometric information may not be measured based on the measurement value RXP received for 2 frame periods after starting the biometric information measurement mode. Accordingly, since the display apparatus 100 does not measure the biometric information in the frame periods immediately after the mode conversion, a problem due to noise occurred immediately after the mode conversion may be prevented.

Figure 11:
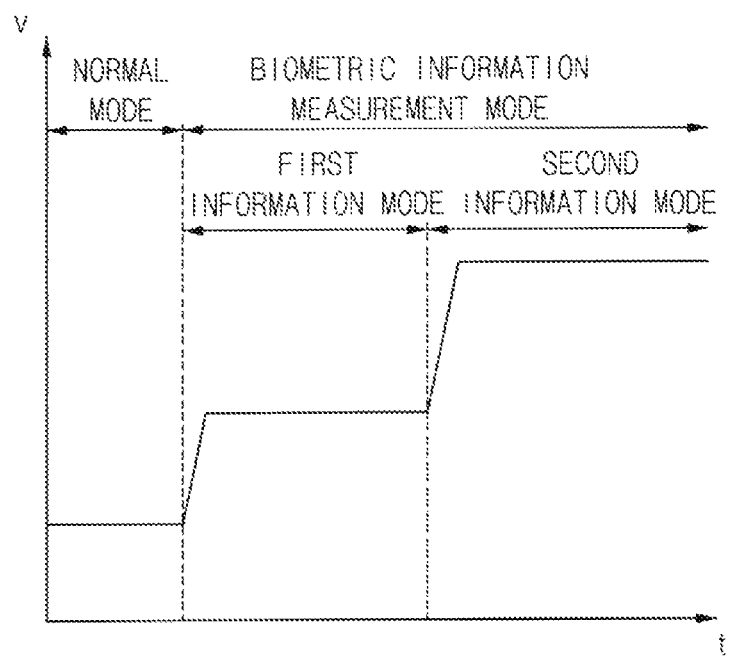
FIGS. 11 and 12 are diagrams illustrating an example in which the display apparatus of FIG. 1 adjusts voltage of a transmission signal over time in a biometric information measurement mode.
Figure 12:
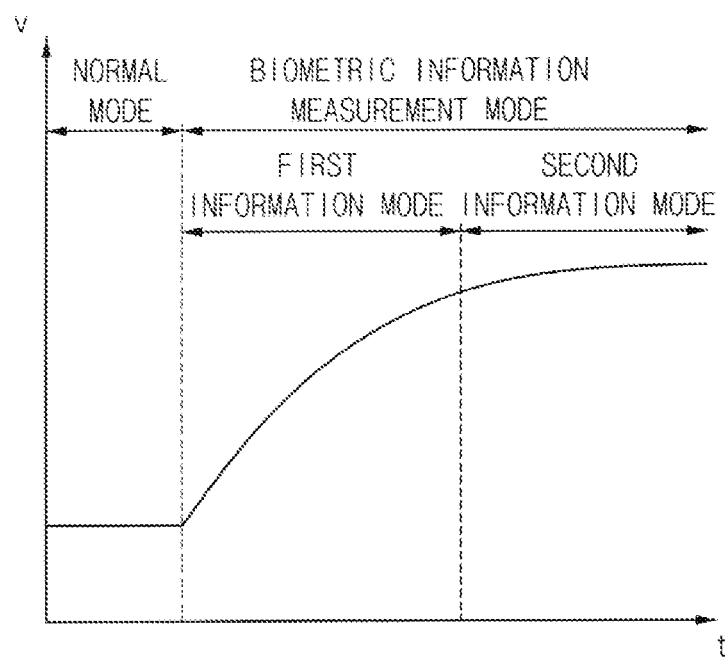

FIGS. 11 and 12 are diagrams illustrating an example in which the display apparatus 100 of FIG. 1 adjusts voltage of the transmission signal TXP over time in the biometric information measurement mode.

Referring to FIGS. 11 and 12, in the biometric information measurement mode, the touch driver 220 may apply the transmission signal TXP having a voltage greater than a voltage of the transmission signal TXP in the normal mode. The touch driver 220 may adjust the voltage of the transmission signal TXP such that the voltage of the transmission signal TXP may increase over time in the biometric information measurement mode. The biometric information measurement mode includes a first information mode and a second information mode. The touch driver 220 may operate the first information mode and the second information mode. The voltage of the transmission signal TXP in the first information mode may be smaller than the voltage of the transmission signal TXP in the second information mode.

A variation range of mutual capacitance at the intersection points according to the touch of the object or the change in the biometric information may increase as the voltage of the transmission signal TXP increases. Therefore, the display apparatus 100 may measure the change in the mutual capacitance more precisely in the biometric information measurement mode than in the normal mode.

In the first information mode, the skin hydration level of the user may be measured. In the second information mode, the muscle density of the user may be measured. The biometric information measured in the second information mode may be the biometric information that may be obtained by measuring a deeper spot in the skin compared to the biometric information measured in the first information mode. The display apparatus 100 may measure various kinds of biometric information according to the voltage by varying the voltage of the transmission signal TXP in the biometric information measurement mode.

For example, the transmission signal TXP applied in the normal mode, the first information mode, and the second information mode may have a predetermined voltage. The touch driver 220 may adjust the transmission signal TXP to have voltage suitable for each mode whenever the mode is changed. Mutually different biometric information may be measured in the first information mode and the second information mode.

For example, the voltage of the transmission signal TXP applied in the first information mode and the second information mode may increase over time. The voltage of the transmission signal TXP may not be predetermined for each specific biometric information. When the voltage of the transmission signal TXP suitable for the biometric information is not determined, the voltage of the transmission signal TXP may be adjusted to increase over time. The display apparatus 100 may distinguish a section in which the first information is measured and a section in which the second information is measured.

Figure 13A:
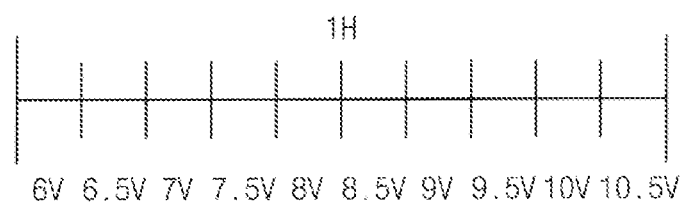
FIG. 13A is a diagram illustrating an example in which the display apparatus of FIG. 1 adjusts voltage of a transmission signal within a frame period in a biometric information measurement mode.

FIG. 13A is a diagram illustrating an example in which the display apparatus 100 of FIG. 1 adjusts the voltage of the transmission signal TXP within a frame period in the biometric information measurement mode.

Figure 13B:
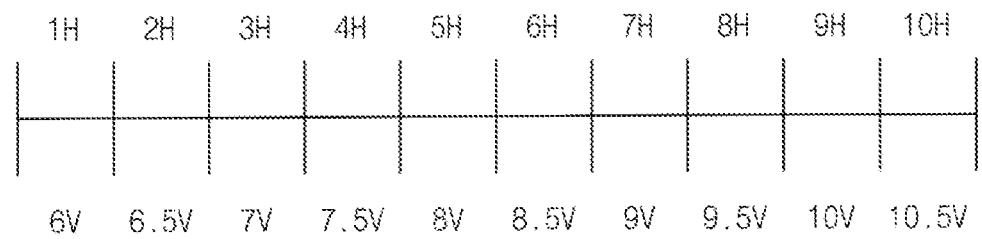
FIG. 13B is a diagram illustrating another example in which the display apparatus of FIG. 1 adjusts voltage of a transmission signal according to a frame period in a biometric information measurement mode.

FIG. 13B is a diagram illustrating an example in which the display apparatus 100 of FIG. 1 adjusts the voltage of the transmission signal TXP according to a frame period in the biometric information measurement mode.

Referring to FIG. 13A, the touch driver 220 may vary the voltage of the transmission signal TXP within one frame period in the biometric information measurement mode. For example, the touch driver 220 may receive the measurement value RXP while increasing the voltage of the transmission signal TXP from 6 V to 10.5 V within one frame period. The touch driver 220 may improve the reliability of the biometric information measured in each frame period by applying the transmission signal TXP while varying the voltage within a frame period in the biometric information measurement mode.

Referring to FIG. 13B, the touch driver 220 may vary the voltage of the transmission signal TXP for each frame period in the biometric information measurement mode. For example, the touch driver 220 may increase the voltage of the transmission signal TXP from 6 V to 10.5 V for each frame period in the range of the first frame period 1H to the tenth frame period 10H.

Figure 14:
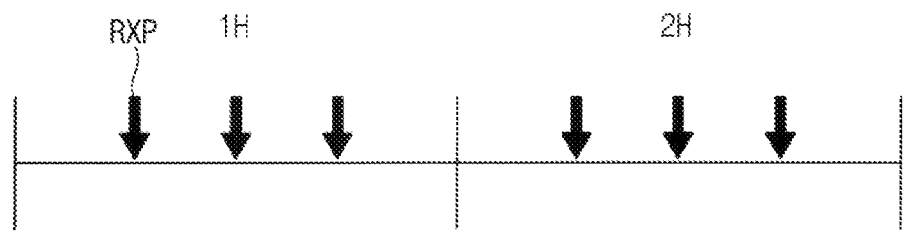
FIG. 14 is a diagram illustrating an example in which the display apparatus of FIG. 1 drives a touch panel in a normal mode.
Figure 15:
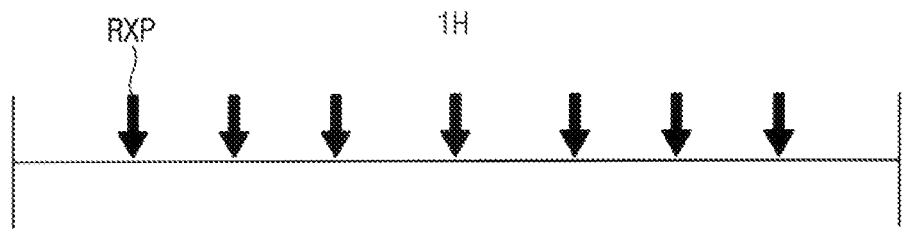
FIG. 15 is a diagram illustrating an example in which the display apparatus of FIG. 1 drives a touch panel in a biometric information measurement mode.

FIG. 14 is a diagram illustrating an example in which the display apparatus 100 of FIG. 1 drives the touch panel 400 in the normal mode. FIG. 15 is a diagram illustrating an example in which the display apparatus 100 of FIG. 1 drives the touch panel 400 in the biometric information measurement mode.

Referring to FIGS. 14 and 15, the touch driver 220 may measure the biometric information based on the measurement value received from each electrode during the sensing period including K frame periods in the biometric information measurement mode. The touch driver 220 may adjust a frame frequency (e.g., a frame rate or a refresh rate) such that the frame frequency in the biometric information measurement mode is lower than the frame frequency in the normal mode. In the biometric information measurement mode, the time of one frame period may be increased.

For the purpose of convenience of explanation, it is assumed that K is 1. For example, the touch driver 220 may receive the measurement value RXP three times during one frame in the normal mode. The touch driver 220 may lower the frame frequency in the biometric information measurement mode. One frame period in the biometric information measurement mode may be longer than one frame period in the normal mode. Accordingly, the touch driver 220 may receive the measurement value RXP more than three times in the biometric information measurement mode.

The display apparatus 100 may receive more measurement values RXP during one frame period by adjusting the frame frequency to be low in the biometric information measurement mode, thereby precisely measuring the change in the mutual capacitance according to the change in the biometric information. In addition, the time required to measure the biometric information may be shortened because the biometric information may be measured with fewer frames.

Figure 16:
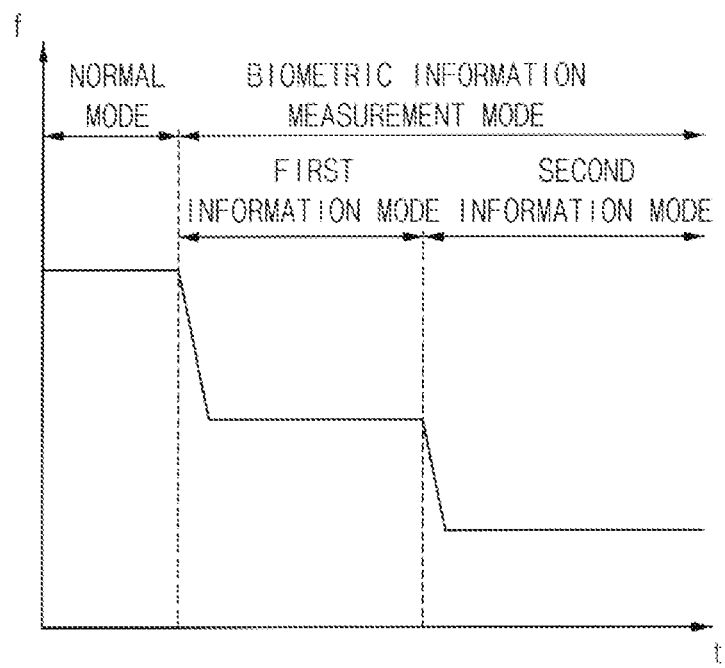
FIG. 16 is a diagram illustrating an example in which the display apparatus of FIG. 1 adjusts a frame frequency over time in a biometric information measurement mode.
Figure 17:
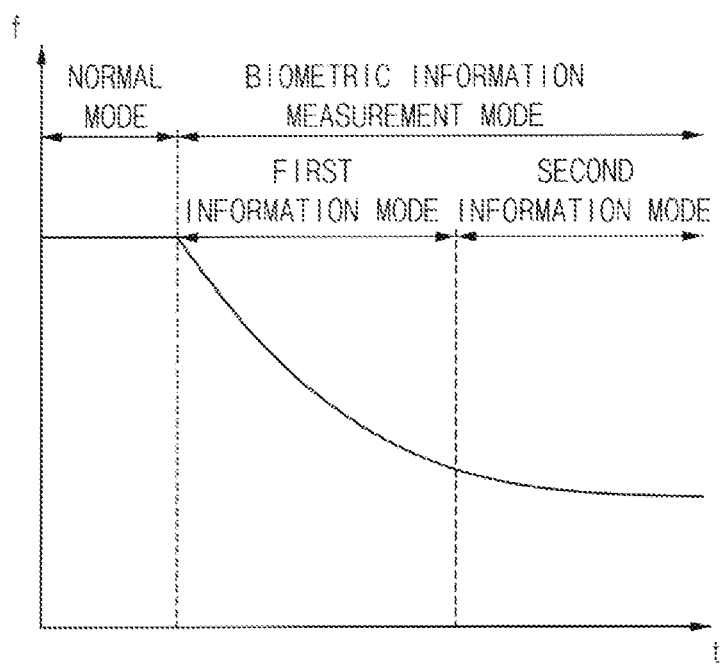
FIG. 17 is a diagram illustrating another example in which the display apparatus of FIG. 1 adjusts a frame frequency over time in a biometric information measurement mode.

FIG. 16 is a diagram illustrating an example in which the display apparatus 100 of FIG. 1 adjusts the frame frequency over time in the biometric information measurement mode. FIG. 17 is a diagram illustrating an example in which the display apparatus 100 of FIG. 1 adjusts the frame frequency over time in the biometric information measurement mode.

The touch driver 220 may adjust the frame frequency such that the frame frequency decreases over time in the biometric information measurement mode. The biometric information measurement mode may include a first information mode and a second information mode. The touch driver 220 may operate the first information mode and the second information mode. The frame frequency in a first information mode may be greater than the frame frequency in a second information mode.

In the first information mode, the skin hydration level of the user may be measured. In the second information mode, the muscle density of the user may be measured. The biometric information measured in the second information mode may be the biometric information that may be obtained by measuring a deeper spot in the skin compared to the biometric information measured in the first information mode. The display apparatus 100 may measure various kinds of the biometric information according to voltages by varying the frame frequency of the transmission signal TXP in the biometric information measurement mode.

For example, the frame frequency may have a predetermined specific value in the normal mode, the first information mode, and the second information mode. The touch driver 220 may adjust the frame frequency suitable for each mode whenever a mode is changed. Mutually different biometric information may be measured in the first information mode and the second information mode.

For example, in the first information mode and the second information mode, the frame frequency may decrease over time. The frame frequency may not be predetermined for each specific biometric information. If the frame frequency suitable for the biometric information is not known, the frame frequency may be adjusted to decrease over time. The display apparatus 100 may distinguish a section in which the first information is measured and a section in which the second information is measured.

Figure 18:
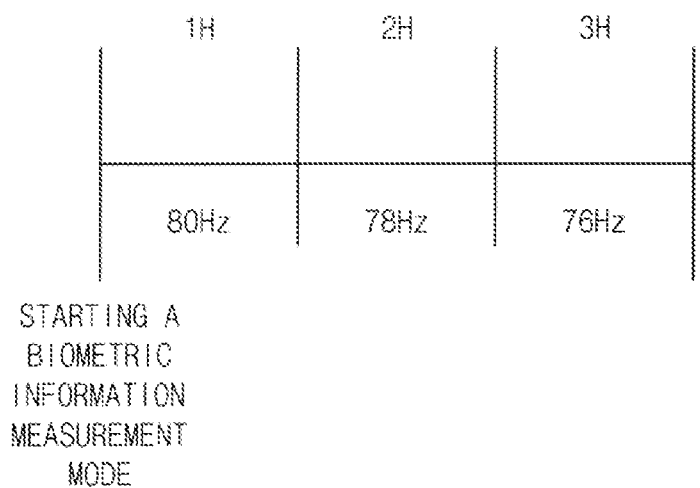
FIG. 18 is a diagram illustrating another example in which the display apparatus of FIG. 1 adjusts a frame frequency according to a frame period in a biometric information measurement mode.

FIG. 18 is a diagram illustrating an example in which the display apparatus of FIG. 1 adjusts a frame frequency according to a frame period in the biometric information measurement mode.

Referring to FIG. 18, the touch driver 220 may change the frame frequency for each frame period in the biometric information measurement mode. For example, the touch driver 220 may set the frame frequency (e.g., a frame rate or a refresh rate) to 80 Hz for the first frame period 1H in the biometric information measurement mode. The touch driver 220 may set the frame frequency to 78 Hz for the second frame period 2H in the biometric information measurement mode. The touch driver 220 may set the frame frequency to 76 Hz for the third frame period 3H in the biometric information measurement mode. For example, the length of the first frame period 1H may be shorter than that of the second frame period 2H. For example, the length of the second frame period 2H may be shorter than that of the third frame period 3H.

The display apparatus 100 according to embodiments may measure the change in the mutual capacitance more precisely in the biometric information measurement mode than in the normal mode. In addition, the display apparatus 100 according to embodiments may measure various kinds of the biometric information and shorten the measurement time of the biometric information.

The embodiments may be applied any electronic device including the display apparatus 1000. For example, the embodiments may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the embodiments and is not to be construed as limiting thereof. Although a few exemplary embodiments of have been described, those skilled in the art will readily appreciate that many modifications are possible in the exemplary embodiments without materially departing from the novel teachings and advantages of the embodiments. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus comprising:
a touch panel including a plurality of electrodes having first electrodes and second electrodes; and
a touch driver configured to drive the touch panel,
wherein the touch panel includes the first electrodes extending in a first direction and the second electrodes extending in a second direction intersecting the first direction, the second electrodes overlapping the first electrodes,
wherein the touch driver is configured to drive the touch panel in a normal mode and a biometric information measurement mode,
wherein the touch driver is configured to apply a transmission signal to the first electrodes by shifting the transmission signal for groups each including N first electrodes such that the N first electrodes in a same group simultaneously receive the transmission signal, where N is a positive integer, in the normal mode, and to apply the transmission signal to the first electrodes by shifting the transmission signal for groups each including Q first electrodes such that the Q first electrodes in a same group simultaneously receive the transmission signal, where Q is a positive integer greater than N, in the biometric information measurement mode,
wherein the touch driver is configured to measure biometric information based on a measurement value received from at least one of the first and second electrodes during a sensing period having K frame periods, where K is a positive integer, in the biometric information measurement mode, and
wherein the touch driver applies the transmission signal to the second electrodes by shifting the transmission signal for groups each including Q second electrodes such that the Q second electrodes in a same group simultaneously receive the transmission signal after applying the transmission signal to the first electrodes in the biometric information measurement mode.

2. The display apparatus of claim 1, wherein the touch driver is configured to apply the transmission signal only to predetermined row electrodes of the first electrodes or predetermined column electrodes of the second electrodes in the biometric information measurement mode.

3. The display apparatus of claim 2, wherein the touch driver is configured to measure the biometric information at intersection points between the first electrodes and the second electrodes based on the measurement value received from the first electrodes and the measurement value received from the second electrodes.

4. The display apparatus of claim 3, wherein the touch driver is configured not to measure the biometric information during a predetermined reference period after the normal mode is converted into the biometric information measurement mode.

5. The display apparatus of claim 1, wherein the touch driver is configured not to apply the transmission signal to an electrode having a measurement value not exceeding a predetermined reference value while a touch operation is being sensed in the biometric information measurement mode.

6. The display apparatus of claim 5, wherein the touch operation is sensed by determining whether a sum of the measurement values generated by the transmission signal exceeds a predetermined threshold value.

7. The display apparatus of claim 1, wherein, in the biometric information measurement mode, the touch driver is configured to apply the transmission signal having a voltage greater than a voltage of the transmission signal in the normal mode.

8. The display apparatus of claim 7, wherein the touch driver is configured to adjust the voltage of the transmission signal such that the voltage of the transmission signal increases over time in the biometric information measurement mode.

9. The display apparatus of claim 8, wherein the biometric information measurement mode comprises a first information mode and a second information mode,
wherein the touch driver is configured to operate the first information mode and the second information mode, and
wherein the voltage of the transmission signal in the first information mode is smaller than the voltage of the transmission signal in the second information mode.

10. A display apparatus comprising:
a touch panel comprising a plurality of electrodes including first electrodes and second electrodes; and
a touch driver configured to drive the touch panel,
wherein the touch panel comprises:
wherein the touch panel includes the first electrodes extending in a first direction and the second electrodes extending in a second direction and overlapping the first electrodes,
wherein the touch driver is configured to drive the touch panel in a normal mode and a biometric information measurement mode,
wherein the touch driver is configured to apply a transmission signal to the first electrodes by shifting the transmission signal for groups each including N first electrodes such that the N first electrodes in a same group simultaneously receive the transmission signal, where N is a positive integer, in the normal mode, and to apply the transmission signal to the first electrodes by shifting the transmission signal for groups each including Q first electrodes such that the Q first electrodes in a same group simultaneously receive the transmission signal, where Q is a positive integer greater than N, in the biometric information measurement mode,
wherein the touch driver is configured to measure biometric information based on a measurement value received from at least one of the first and second electrodes during a sensing period having K frame periods, where K is a positive integer, in the biometric information measurement mode,
wherein the touch driver is configured to apply the transmission signal having a voltage in the biometric information measurement mode greater than a voltage of the transmission signal in the normal mode, and
wherein the touch driver is configured to adjust the voltage of the transmission signal such that the voltage of the transmission signal increases over time in the biometric information measurement mode.

11. The display apparatus of claim 10, wherein the biometric information measurement mode comprises a first information mode and a second information mode,
wherein the touch driver is configured to operate the first information mode and the second information mode, and
wherein the voltage of the transmission signal in the first information mode is smaller than the voltage of the transmission signal in the second information mode.

12. The display apparatus of claim 11, wherein the touch driver is configured not to measure the biometric information during a predetermined reference period after the normal mode is converted into the biometric information measurement mode.

\* \* \* \* \*